United States Patent [19]

Hormel et al.

[11] Patent Number: 5,748,675
[45] Date of Patent: May 5, 1998

[54] VEHICLE COMMUNICATIONS NETWORK WITH IMPROVED CURRENT SOURCING

[75] Inventors: Ronald F. Hormel, Clinton Township; Frederick O. Miesterfeld, Troy, both of Mich.

[73] Assignee: Chrysler Corporation, Auburn Hills, Mich.

[21] Appl. No.: 394,104

[22] Filed: Feb. 24, 1995

Related U.S. Application Data

[63] Continuation-in-part of Ser. No. 252,706, Jun. 2, 1994, Pat. No. 5,432,817, which is a continuation-in-part of Ser. No. 951,989, Sep. 28, 1992, abandoned.

[51] Int. Cl.$^6$ .................... H04B 1/38; H04L 5/16
[52] U.S. Cl. .................... 375/257; 375/259; 375/219; 375/220
[58] Field of Search .................... 375/257, 259, 375/238, 219, 220; 327/108, 518; 370/212, 213

[56] References Cited

U.S. PATENT DOCUMENTS

| | | | |
|---|---|---|---|
| 4,594,577 | 6/1986 | Mao. | |
| 4,706,082 | 11/1987 | Miesterfeld | 340/825.5 |
| 4,736,323 | 4/1988 | Utsumi et al. | 364/431.12 |
| 4,804,937 | 2/1989 | Barbiaux et al. | |
| 4,890,010 | 12/1989 | Neudeck et al. | 370/85.1 |
| 5,274,636 | 12/1993 | Halter et al. | 370/85.1 |
| 5,337,042 | 8/1994 | Hormel et al. | 340/826.08 |
| 5,363,405 | 11/1994 | Hormel | 375/219 |

OTHER PUBLICATIONS

Henry W. Ott, "Noise Reduction Techniques in Electronic Systems" Second Edition; 1988. pp. 37-42.

*Primary Examiner*—Stephen Chin
*Assistant Examiner*—Hai H. Phan
*Attorney, Agent, or Firm*—Roland A. Fuller, III

[57] ABSTRACT

A vehicle communications network is provided which includes a ground translation circuit and interfacing transmitter circuits that achieve smooth current sourcing transitions. Included is a communications bus such as a J1850 having multiple-access for interfacing with a plurality of electronics, preferably within a vehicle. Each transceiver has a transmitter and receiver interfaced with the bus. The transceiver is coupled via a resistive element to the communications bus and sources current onto the bus when the transmitter output voltage exceeds the bus voltage. The added resistance advantageously reduces changes in current which may otherwise exist on the communications bus when current sourcing switches on and off.

10 Claims, 5 Drawing Sheets

VEHICLE COMMUNICATIONS NETWORK WITH IMPROVED CURRENT SOURCING

CROSS-REFERENCE TO RELATED APPLICATIONS

This application is a continuation-in-part of U.S. patent application Ser. No. 08/252,706, filed Jun. 2, 1994, now U.S. Pat. No 5,432,817, which is a file wrapper continuation-in-part of U.S. patent application Ser. No. 07/951,989, filed Sep. 28, 1992, now abandoned.

BACKGROUND OF THE INVENTION

1. Technical Field

The present invention generally relates to data communication networks and, more particularly, to a vehicle multi-access communications network with enhanced transmitter interfacing for realizing improved current sourcing.

2. Discussion

Modern automotive vehicles are commonly equipped with multiple-access serial data communications networks to enable data transfers between various electronics within the vehicle. The Society of Automotive Engineers (SAE) has established a Standard J1850 Class B data communications network that has become widely accepted throughout the automotive industry. The standard J1850 is a set of technical requirements and parameters which specify the use of symbols for communicating serial data over a communications bus.

Input/output (I/O) bus transceivers are generally equipped with the vehicle electronics and interface with the communications bus to transmit and receive data. In automotive applications, variable pulse width modulation (VPWM) encoded signals are widely used. With VPWM encoded signals, a symbol includes a voltage logic level that extends for a period of time and then a voltage transition or edge. Generally speaking, the amount of time and the voltage level between trip points of the previous edge and the current edge defines the meaning of the symbol.

In communications networks where multiplexing schemes transfer pulse signals from one node (i.e., electronic module) to another, ground loops often become a source of noise. Noise results especially when large distances separate multiple ground points and during employment of low-level analog circuits. It becomes necessary to provide some form of discrimination or isolation against ground path noise and direct current offset voltages.

Grounding of nodes in multinode systems occur at different points resulting in potential differences between grounds; e.g., chassis ground and signal ground. Grounding components in vehicles necessitate this grounding approach. This usually causes unwanted noise voltages in the network. The magnitude of signal levels compared to noise voltages in the network provides a signal-to-noise ratio. If the signal-to-noise ratio affects network operations, then effort to improve the ratio must take place.

Past noise reduction remedies included two basic approaches: 1) avoid the ground loops by removing one of the type grounds and converting the system to a single-point ground network. (This provides an impractical remedy since DC currents cause voltage drops, and since additional circuit components are required at an added cost); 2) eliminate or minimize the effects of multiple grounds by isolating the two or more circuits. Isolation can be achieved by using: 1) transformers, 2) common-mode chokes, 3) optical couplers and 4) balanced circuitry.

Such noise reduction techniques yield favorable results, but these techniques require large numbers of isolating components. Such components are costly and may introduce other adverse effects which are entirely unanticipated. In an effort to minimize isolation problems in multinode networks, a search took place to find other means of isolating ground loops in multinode networks.

Additionally, each node or electronic device generally must have its own input/output bus transceiver to interface with the communications bus. Each input/output bus transceiver contains a transmitter circuit with a bus driver for transmitting data onto the vehicle communications bus. Conventional transmitter circuits with bus drivers usually operate to provide a preset voltage potential to the bus. With the multiple-access bus, the transmitting circuit drives the bus when the transmitter output voltage exceeds the voltage potential seen on the bus. As between multiple nodes, the node outputting the higher voltage potential generally drives the bus. When a transmitter circuit and associated bus driver applies a voltage, the bus driver also sources current from the bus driver onto the communications bus.

However, vehicular communications networks are often subjected to various noises sources which induce noise onto the data line, often through the grounding lines. On the one hand, ground noise can induce a change in the bus voltage. Also, on the other hand, changes in current on the bus can inject noise into surrounding electronics. The induced voltage is generally a function of the mutual inductance between two circuits and the rate of change of current. This principle is disclosed on page 38 of "Noise Reduction Techniques in Electronic Systems", 2nd edition, by Henry Ott. This induced voltage also causes changes in sourcing current on the bus. Conventionally, current changes can occur almost instantaneously and are often measured as current spikes. Such drastic current changes can cause an abrupt imbalance between the interfacing electronic devices and allow for relatively large amounts of noise to be induced onto sensitive electronics.

It is therefore one object of the present invention to provide for a vehicle communications network with multiple electronics interfacing and enhanced ground translation circuitry.

It is another object of the present invention to provide for a multi-access vehicle communications network which reduces induced noise effects, especially noise associated with nearby magnetic fields.

It is a further object of the present invention to provide for such a multi-access vehicle communications network which interfaces a plurality of transmitter circuits with bus drivers and reduces the rate of change of sourcing current on the communications bus.

SUMMARY OF THE INVENTION

To achieve the foregoing objectives, the present invention is a vehicle communications network which has a multi-access communications bus interfaced with a plurality of electronics or nodes. The communications network employs a communications bus such as a J1850 single-wire bus commonly found on a vehicle. The nodes are interfaced with the bus and each node includes a transmitter with bus driver having an output circuit for sourcing current onto the bus when the output circuit voltage exceeds the voltage seen on the bus. As between multiple nodes, the node outputting the highest voltage generally drives the bus and therefore sources current onto the bus. A resistive element is coupled between each bus driver and the communications bus for reducing the rate of change of current on the communications bus. This advantageously provides for a more controlled rate of change of current which further eliminates noise problems associated therewith.

BRIEF DESCRIPTION OF THE DRAWINGS

Other objects and advantages of the present invention will become apparent to those skilled in the art upon reading the following detailed description and upon reference to the drawings in which:

FIG. 6 is a block diagram of an integrated circuit transceiver chip with a loop back connection for verifying information transmitted by the transmitter circuit.

DETAILED DESCRIPTION OF THE PREFERRED EMBODIMENT

Figure 1:
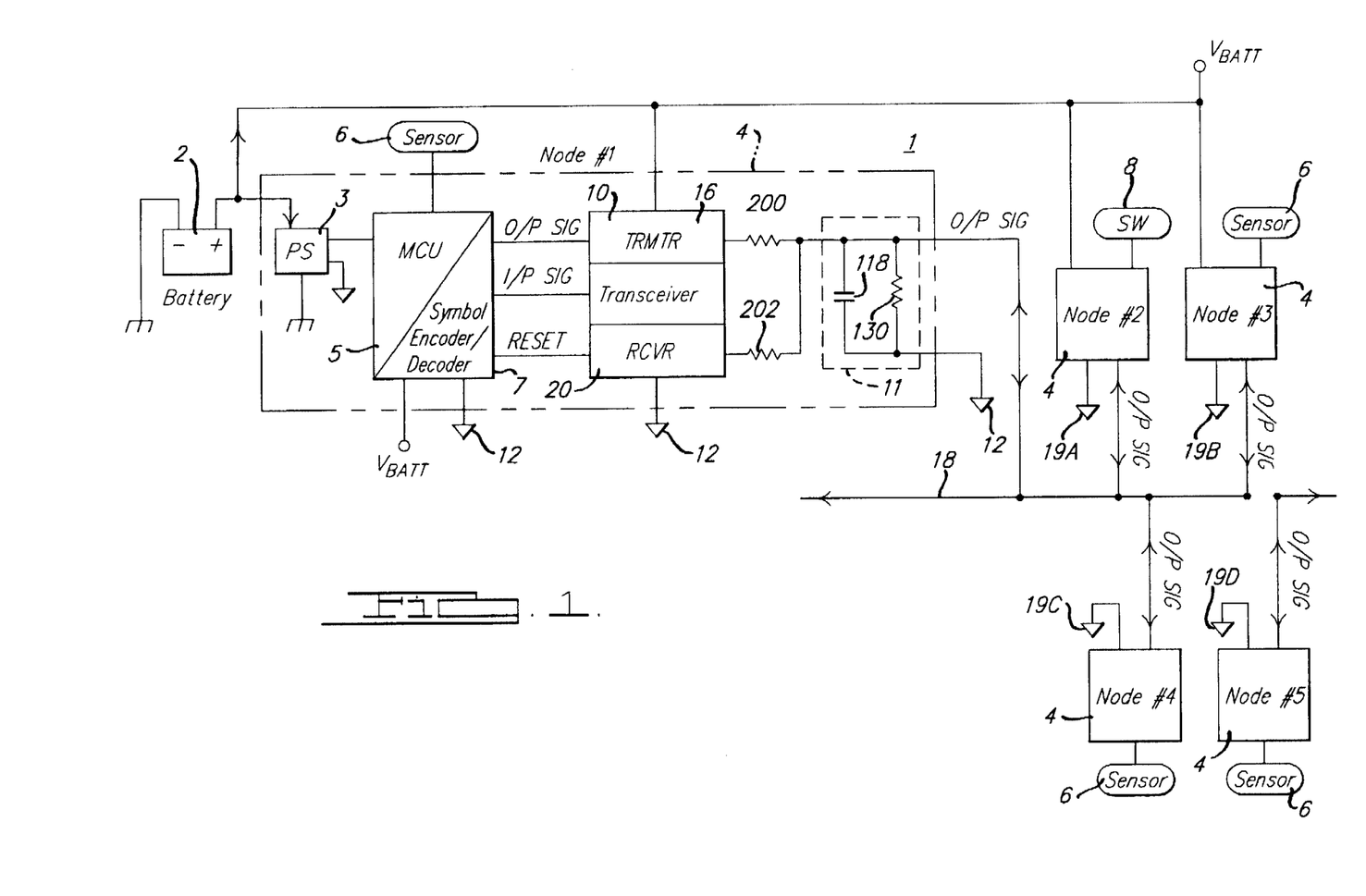
FIG. 1 illustrates a communications network with multiple nodes interfaced with a communications bus according to the present invention.

Turning now to FIG. 1, a multiplexing network 1 is shown which includes a plurality of nodes 4 interfacing a multi-access serial data communications bus 18. Each node either includes or is connected to an electronic device such as sensor 6 or switch 8. The plurality of nodes 4 are coupled to communications bus 18 and provide data communication interfacing therebetween as will be discussed hereinafter.

With a negative terminal grounded to the chassis of a vehicle, a battery 2 supplies battery power (+$V_{batt}$) to the network nodes 4. Each 5-volt DC regulated power supply 3 in each of the identical of nodes 4 receives $V_{batt}$ and provides, at an output terminal, a suitable regulated 5 Vdc to a plurality of signal conditioning circuits. In addition to the regulated power source 3, each node 4 contains a microcontroller (MCU) 5, preferably an 8-bit, single-chip microcontroller, a suitable symbol encoder/decoder (SED) 7, a transceiver 10 and a termination network 11.

MCU 5 receives sensor or switch signals and then uses the signals to generate control signals for manipulating SED 7 to produce a plurality of message symbols in a suitable Variable Pulse Width Modulation (VPWM) format. Transceiver 10, interfaced with bus 18 through resistors 200 and 202 and the termination network 11, accepts the message symbols from SED 7 and translates message symbols referenced with respect to a signal ground return circuit to message symbols referenced with respect to bus ground return. Transceiver 10 then transmits the messages over bus 18 in an analog VPWM format to other nodes 4.

Each transceiver 10 contains waveshaping and bus transfer circuits. A separate ground return (signal ground return 12) for node #1 relates to waveshaping circuits, while separate connections to the signal ground return 12 are used for bus transfer circuits. The waveshaping circuits of the transceiver 10 appear in U.S. Pat. No. 5,337,042, issued Aug. 9, 1994 and entitled "Vehicle Communications Network Transceiver, Transmitter Circuit Therefor". The aforementioned patent is incorporated herein by reference.

Bus 18, unlike conventional single-wire buses, does not depend on a large number of turns of twisted wire or shielding material to minimize noise. Instead, bus 18 preferably routes throughout the small area networks as an untwisted wire with untwisted wire extensions depending from each node. Some noise control results from shaping of the VPWM signals received at the transmitting and receiving portion of transceiver 10.

The block diagrams portray several other nodes 4 (nodes #2–#5), as shown in FIG. 1, each of which likewise employs the transceiver 10, termination network 11 and other circuitry shown in connection with Node #1. The single-wire bus 18 routes to interconnect the other nodes 4. In each of nodes 4, transceiver 10 includes both transmitter (TRMTR) 16 and receiver (RCVR) 20 circuits. The transceiver 10 has ground translation circuits in the transmitter 16 and receiver 20. It should be understood that each node may be connected to a different signal ground such as grounds 12 and 19A, 19B, 19C and 19D which may be located at different locations on a vehicle.

The Transmitter Circuit

Figure 2:
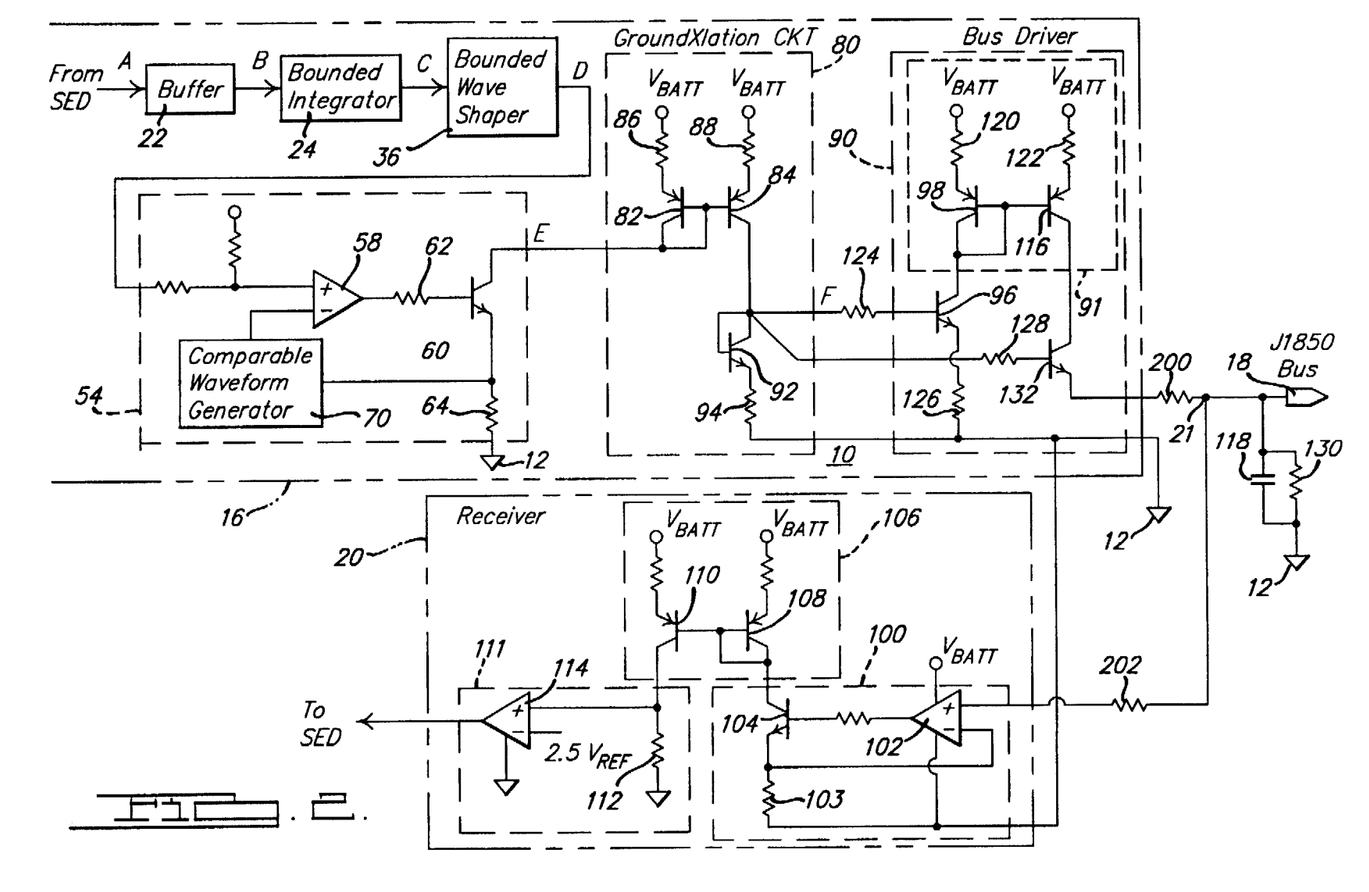
FIG. 2 illustrates in electrical schematic and block diagram form a transceiver associated with one node interfaced with the communications bus of the present invention.

With reference now to FIG. 2, this figure depicts in partial block diagram and electrical schematic diagram form a transceiver 10 which includes transmitter 16 and receiver 20 coupled to communications bus 18. The symbol encoder/decoder (SED) 7 of FIG. 1 produces a plurality of message symbols in a suitable VPWM square-wave format. The square wave signal enters buffer 22 at port A of FIG. 2 and then leaves through port B to enter bounded integrator 24.

The bounded integrator 24 inverts and integrates the square-wave signal and then produces at an output port C a symmetrical trapezoid type waveform signal. The trapezoid signal carries pulses having edges with lengthened rise and fall times, reduced amplitudes and established trigger-point-voltages. The established trigger-point-voltages maintain each symbol length equidistant with respect to the pulse width of the symbols expressed in the input square-wave waveform.

A bounded waveshaper 36 receives the output signal from bounded integrator 24 at point C. The waveshaper 36 reshapes both pulse corners at the extremities of each edge over a chosen duration. Waveshaper 36 then produces at port D another trapezoid waveform signal in phase with the input waveforms which includes pulses with increased curvature corners and increased amplitudes with respect to the trip-point voltage.

The reshaped trapezoid waveform signal at point D enters voltage-to-current converter device 54 and gets transformed into a controlling voltage for the input loop of a buffer transistor 60. The voltage-to-current converter device 54 includes an operational amplifier (op-amp) 58 operatively coupled to the transistor 60. The reshaped trapezoid waveform signal at port D applies to a non-inverting (+) terminal of op-amp 58. Op-amp 58 performs a voltage difference measurement with respect to a comparable waveform generated from a feedback associated circuit 70 applied to an inverting (−) terminal of op-amp 58. The output of op-amp 58, an analog signal, gets amplified and applied to the base of transistor 60 through a base resistor 62 providing base current to the input loop of the transistor.

Battery current from a current mirror 80 enters, through the collector terminal of transistor 60, the output loop of transistor 60. This output loop provides a programmed current-sink circuit used to sink current at port E routed from the current mirror circuit 80. Transistor 60 controls the amount of current-sinking between the collector and emitter terminals. Changes in the base voltage cause corresponding changes in the emitter voltage across the emitter resistor 64.

Current mirror device 80, connected in this embodiment to raw battery power $V_{BATT}$, reacts to controlled current signals of buffer transistor 60 in the voltage-to-current converter device 54 connected to one output of device 80. Current mirror device 80 uses the technique of matched base-emitter biasing of matched-pair dual PNP transistors 82 and 84 to produce a current source output which mirrors the controlled current signal. Transistor 82 of the matched pairs acts as a reference diode with its base terminal shorted to the collector terminal and its emitter terminal connected to a first input terminal which supplies $V_{BATT}$ through an emitter resistor 86. The emitter terminal of transistor 84 connects to a second input terminal which supplies $V_{BATT}$ through emitter resistor 88.

The current output path of referenced diode 82 routes to the collector of buffer transistor 60 of device 54 and returns to signal ground 12. When transistor 60 operates, it sinks the reference diode current to signal ground. This causes a Vbe of transistor 82 appropriate to that current at the circuit temperature and for that transistor type. Transistor 84 matched to transistor 82 thereby sources the same current to another transistor 92 connected as a reference diode. The emitter of transistor 92 returns current through an emitter resistor 94 to signal ground 12, a return independent of signal ground 12. With transistor 92 connected as the second reference diode, the voltage across resistor 94 clamps at one diode drop below the voltage appearing at port F.

The pulse voltage across resistor 94 and ground 12, illustratively, of about 8.0 $V_{p-p}$, exhibits about four times the pulse voltage appearing across resistor 64 and signal ground 12. The pulse width (PW) of both pulses remain constant at, illustratively, 64 μs at the trip points regardless of the changes in ground potential in each node of the network. Hence, any voltage offsets between various connections to signal ground in each node will not affect the symbol timing content of the messages transferred over the bus 18.

As mentioned supra, the voltage appearing at port F, about four times the pulse voltage across resistor 64 of device 54, provides base current to the input loop of transistor 96 through base resistor 124. Raw battery current flowing through emitter resistors 120 and 122 and to a current mirror circuit 91 of bus driver 90 enters the collector terminal in the output loop of transistor 96. This output loop provides a programmed current-sink circuit used to sink current from the reference diode circuit 98 of current mirror circuit 91. Transistor 96 controls the amount of current-sinking between the collector and emitter terminals. Changes in the base voltage cause corresponding changes in the emitter voltage across the emitter resistor 126. A nearly identical current flowing through the reference diode 98 of current mirror 91 is reflected into the output loop of transistor 116. When transistor 116 operates, it sources the reflected current to single wire bus 18.

The pulse voltage across resistor 126 and ground 12, illustratively, of about 8.0 volts $_{p-p}$, also exhibits about four times the pulse voltage appearing across resistor 64 and signal ground 12. The pulse width of both pulses remain constant at, illustratively, 64 microseconds at the trip points regardless of the changes in ground potential in each node of the network. Hence, the voltage offsets between various connections to signal ground 12 in each node will not affect the symbol timing content of the messages transferred over the bus. The bus driver 90 is described in more detail in U.S. Pat. No. 5,363,405, issued Nov. 8, 1994, and entitled "Vehicle Communications Network Transceiver, Bus Driver Therefor". The aforementioned issued patent is incorporated herein by reference.

Receiver Circuit

From bus 18 at node 21, bus voltage, referenced to signal ground 12, and symbol information immediately route back to the input of receiver 20, an active load. The routed back path between node 21 and receiver 20 includes isolation resistor 202 which provides a relatively large input resistance to receiver 20. Isolation resistor 202 may have a resistance of about 15 kΩ, for example. There, another voltage-to-current converter circuit 100, including an operational amplifier 102, terminating resistor 103 and a buffer transistor 104, controls the current in an input circuit of another current mirror circuit 106.

Current mirror circuit 106 comprised of referenced diode 108 and output transistor 110 supplies programmed pulse current to load resistor 112 which is referenced now to signal ground 12 in an output circuit. Translation of signals from bus return 19 back to signal return 12 occur in current mirror circuit 106. Battery voltage connected to the emitter of referenced diode transistor 108 causes current to flow in the output loop of transistor 108 and into the output loop of current-sink transistor 104 of the voltage-to-current converter 100. The current in the output loop of transistor 104 is controlled by the changes in base voltage seen at the output of the voltage difference circuit 102. One input terminal of circuit 102 connects to bus 18 through isolation resistor 202 and a second terminal connects to one end of terminator resistor 103. The other end of resistor 103 connects to signal ground 12. The output of circuit 103 provides analog voltage changes to the base terminal of transistor 104 in response to the potential differences existing between the analog voltage waveform on bus 18 and the voltages across resistor 103. The analog voltage changes to the base of transistor 104 cause current in the output loop of transistor 104 to vary in response to the potential difference detected.

Since circuit 106 is a current mirror circuit, the same amount of current flowing in the output loop of transistor 104 will flow in the output loop of transistor 110. Comparator 114 compares the voltage across resistor 112 with a fixed reference voltage, illustratively 2.5 Vdc. The output of comparator 114 provides digital pulse signals referenced with respect to signal ground to SED 7 of FIG. 2. The pulse width of the analog signals remains consistent from the input terminal of the voltage-to-current converter 102 to the output terminal of the voltage comparator 114. SED 7 uses the digital signal to extract symbol information from the pulses.

Transceiver-to-Bus Interface

The transceiver 10 of each node 4 interfaces with the communications bus 18 to transmit and receive data between various nodes 4. To accomplish this, both the transmitter 16 and receiver 20 are coupled to communications bus 18 through respective resistors 200 and 202 as shown in FIGS. 1 and 2. Each node 4 also has a termination network 11 coupled to bus 18. Termination network 11 includes a parallel connected capacitor 118 and resistor 130 coupled to the signal ground 12. Accordingly, the voltage potential on bus 18 for the given node is referenced to the corresponding signal ground 12.

As previously mentioned, receiver 20 is coupled to bus 18 via isolation resistor 202. Isolation resistor 202 has a relatively large resistance which prevents any noticeable flow of current from bus 18 into receiver 20. This ensures that receiver 20 may receive information from bus 18, while having very little affect on the voltage and current waveforms present on bus 18.

Figure 3:
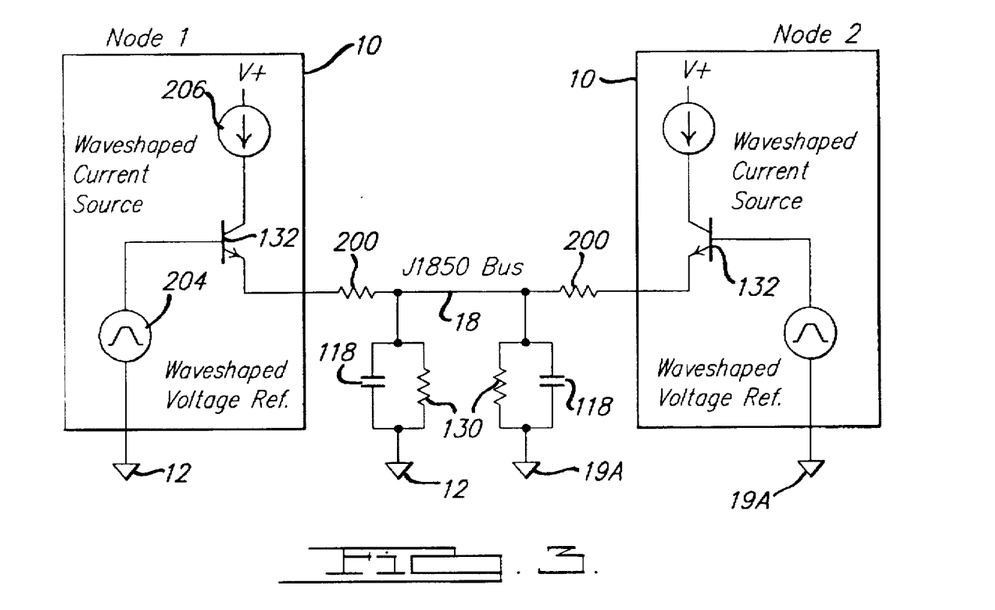
FIG. 3 is circuit diagram illustrating a pair of transmitters with bus driver circuits coupled to the communications bus according to the present invention.

According to the present invention, the transmitter circuit 16 is connected to bus 18 via resistor 200. Each node 4 has a corresponding resistor 200, preferably of equal value, connected to bus 18. Referring to FIG. 3, a pair of transmitters 10 associated with node #1 and node #2 are shown coupled to bus 18. Each transmitter 10 has the corresponding resistor 200 as shown connected to the emitter terminal of transistor 132.

Referring back momentarily to FIG. 2, the varying trapezoidal waveforms shown at terminal F represent a reference voltage signal and the programmed current signals through resistor 126 represents a reference current. The reference voltage signal is illustrated in FIG. 3 as reference numeral 204, while the reference current is shown as reference numeral 206.

With these references, the bus driver circuit can assert unusually tight control over the voltage and current signals placed on the bus 18. The messages contained in the trapezoidal reference signals get reflected on to the bus 18 and transferred to other nodes. Yet, the reference signals at terminal F are unaffected by what happens on the bus 18 because no feedback paths exist between the bus and nodes. Even without feedback paths, these references at terminal F permit automatic circuit reaction to undesirable disturbances on bus 18. By utilizing these references, the bus output waveforms remain stable and do meet the requirements of SAE J1850 without unusual oscillations, glitches or overshoots. The driver circuit produces the desired waveshaped, single-wire bus output over a wide range of bus load resistances, capacitances and inductances and during arbitration. Bus transient noise such as spikes also have less of an effect on the transmitted waveform messages during system operation.

The use of resistor 200 between transmitter 10 and communications bus 18 advantageously reduces the rate of change of current on the communications bus 18. According to one example, each resistor 200 has a relatively small resistance of approximately 10 to 20 ohms, in contrast to an effective bus resistance of around 250–500 ohms. It is preferred that each of resistors 200 have substantially equal resistances. The resistance provided by the resistor 200 is particularly useful during the transition of current on bus 18. As previously mentioned, the transitions of current on bus 18 occur when the driving transmitters switch from one to another as occurs during arbitration, for example. In light of the otherwise sudden current changes, resistor 200 balances the current between two or more transmitters 10. This applies when the internal voltage reference between the transmitters 10 are within a small limit.

Figure 4A:
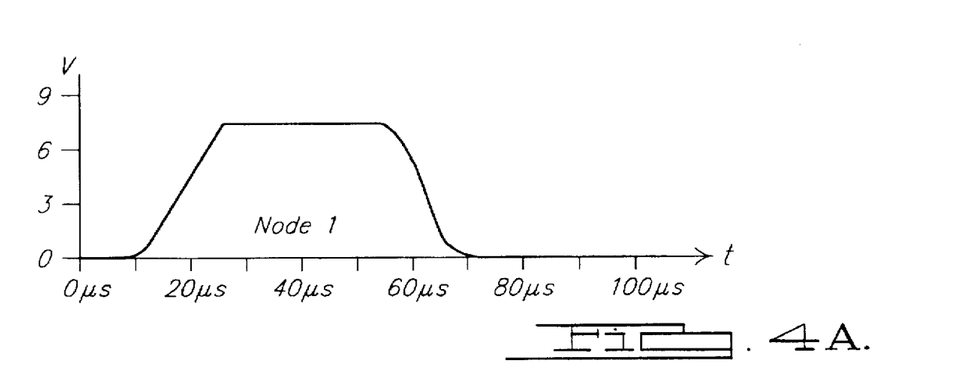
FIGS. 4A–4E illustrate voltage and current waveforms exhibited by the communications network in FIG. 3.
Figure 4B:
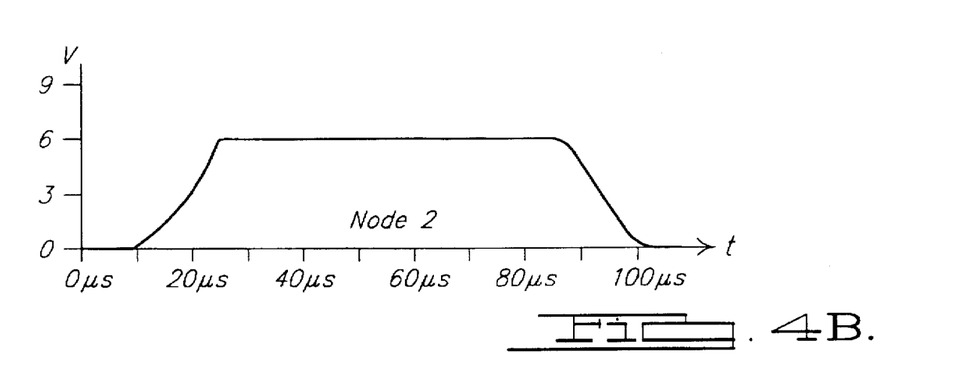
Figure 4C:
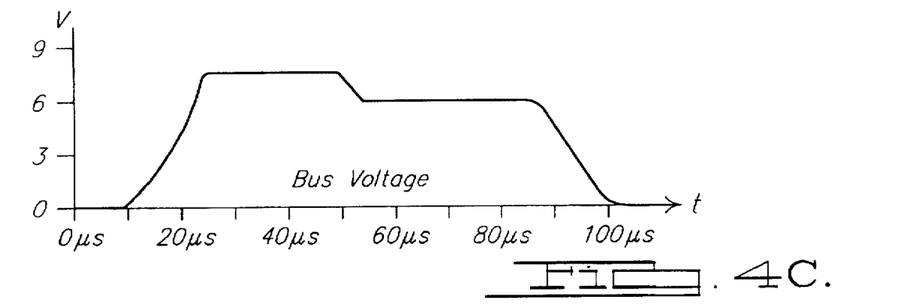

Referring to FIGS. 4A–4E, the effects of bus currents and voltages are illustrated therein in accordance with one example of the communications network shown in FIG. 3 with an arbitration event. In FIG. 4A, a wave-shaped voltage representing a short driven symbol produced by node 1 for transmission on bus 18 is shown with a high voltage potential occurring during a short time duration. The wave-shaped voltage representing a long driven symbol produced by node 2 for transmission on bus 18 is shown in FIG. 4B having a slightly lower voltage potential and a longer time duration. The effect of the voltage waveform shown in FIG. 4A and 4B on bus 18 is illustrated in FIG. 4C. As shown, node 1 will drive bus 18 to the voltage potential produced thereon, since it produces a higher voltage. However, when the voltage of node 1 drops below the voltage of node 2 at the falling edge, node 2 will drive bus 18 at the voltage potential of node 2.

Figure 4D:
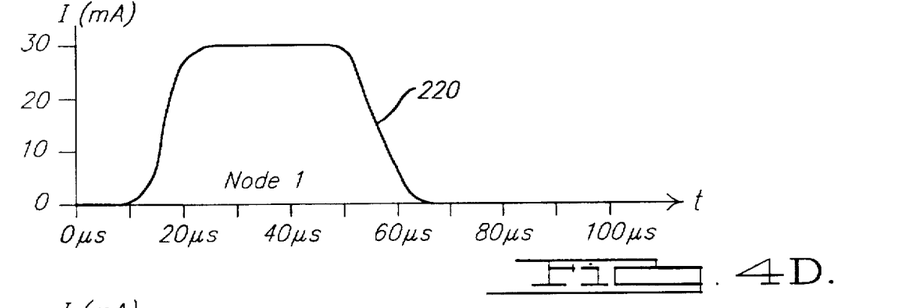
Figure 4E:
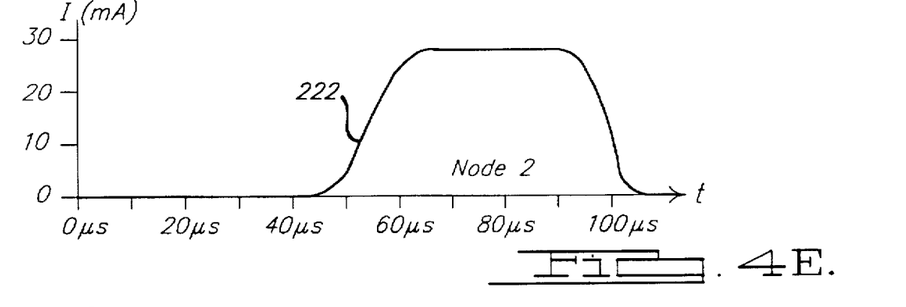

As previously mentioned, when a transmitter 16 applies a voltage to the bus 18, it also sources current onto the communications bus 18. The sourced current from nodes 1 and 2 are shown in FIGS. 4D and 4E, respectively. Accordingly, node 1 will source current while it drives bus 18, while node 2 sources current for the portion over which it drives bus 18. With the inclusion of resistor 200, the current sourcing provided by transmitter 16 will not turn "on" and "off" instantaneously. Instead, the current sourcing of node 1 turns "off" more gradually as shown by sloping current signal 220 in FIG. 4D. Likewise, the current sourcing provided by node 2 turns "on" with more of a gradual rising slope 222 as shown in FIG. 4E.

Figure 5:
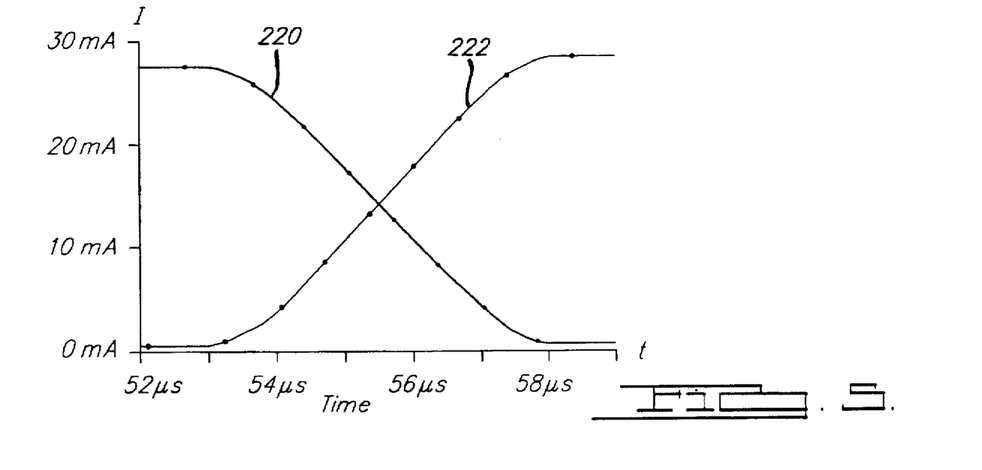
FIG. 5 illustrates waveforms of current sourced onto the communications bus by each of the two transmitters shown in FIG. 3 during arbitration.

The reduced rate of change of current as shown by slopes 220 and 222 is further illustrated in the waveforms provided in FIG. 5. While the individual current sources from nodes 1 and 2 change with a slower rate with respect to time, the overall current source to bus 18 preferably remains substantially constant. That is, the overall current sourced to bus 18 by both node 1 and node 2 remains substantially steady.

If the voltage on bus 18 drops below the voltage level provided by a corresponding node, then the bus driver 90 will source current signals representing the symbol messages onto bus 18. If the voltage on bus 18 exceeds the amplitude of the voltage provided by bus driver 90, then the current in the input loop of transistor 132 will not sufficiently bias and hence transistor 132 will cut off and current will be diverted until the reference voltage amplitude exceeds the voltage on the bus 18. As long as the voltage potential on bus 18 exceeds the voltage potential provided by bus driver 90, the corresponding driver will not drive the bus 18.

Loop Back

The transceiver 10 is also shown as an integrated driver/receiver (IDR) module monolithically integrated on a semiconductor chip as shown in FIG. 6 according to a hardware diagnostic configuration and operable in a loop-back mode. The transmitter circuit 10 generally includes input circuitry 230, logic AND gate 232, waveshaper 36, voltage to current converter 54 and a temperature shutdown 234 with hysteresis. Also included is a level shifter 92 coupled through switch 241 to the output of the waveshaper 36. Level shifter 92 was previously described as a transistor and is coupled to the base of transistor 132. Transistor 132 has an emitter output coupled to the bus 18. As previously described, the receiver circuit receives an input via resistor 202 which is applied to input circuitry 236. Input circuitry 236 is typically set up to provide a signal to bus receiver and voltage comparator 20 which in turn feeds receiver output driver 238.

The transmitter module 10 of FIG. 6 further includes a loop-back path 245 for internally coupling the output of waveshaper 36 directly into bus receiver 20 when in the loop-back mode. The loop-back path 245 is connected to electronic switches 241 and 242 which are controlled by a loop-back mode switch control 240. Switch 241 provides connection between waveshaper 36 and level shifter 92 when in normal contact position SW2. In the loop-back mode, switch 241 connects waveshaper 36 to loop-back path 245 in contact position SW1.

Switch 242 provides a connection between the bus receiver 20 and the input circuitry 236 when in normal switch position SW2. When switch 242 is switched to switch position SW1 in the loop-back mode, switch 242 provides a direct connection between the bus receiver 20 and the waveshaper 36 through the loop-back path 245. Accordingly, switches 241 and 242 are switched to contact position SW1 when in the loop-back mode.

The loop-back mode configuration, as shown in FIG. 6, provides the ability to test and determine if the J1850 bus 18 transmit and receive paths and transceiver 10 are functioning properly. Operation of the loop-back mode is initiated by the MCU controller 5 activating a pin on the transceiver 10 which will break the transceiver feedback path that is connected just before the output driver. This will allow all transmitted VPWM symbols to be internally routed back through the receive circuitry and unaffected by the state of the bus 18. In the loop-back mode the J1850 bus 18 transmit and receive circuitry will be checked with the exception of the output driver. The output driver can otherwise be checked by design because the loop-back path will be interrupted if the output driver is malfunctioning in some way. When a loop-back signal is not received, this implies that something may be wrong with the modules circuitry.

The loop-back path 245 provides a signal to the microprocessor which is then able to test and determine the operation of the transmit and receive circuitry. This can be accomplished by comparing the loop-back signals with the transmitted signals and analyzing the comparison. The loop-back mode internally performs diagnostic testing without adversely affecting the overall communications network.

In addition, the loop-back configuration of FIG. 6 can also be used during a start-up condition. During a start-up, the loop-back mode can be activated when the microprocessor is in reset state. The loop-back mode preferably remains activated until the microprocessor is properly operating and no longer in a reset state. When this occurs, the switches 241 and 242 are actively switched to the normal positions and the loop-back mode is discontinued.

While a specific embodiment of the invention has been shown and described in detail to illustrate the principles of the present invention, it will be understood that the invention may be embodied otherwise without departing from such principles. For example, one skilled in the art will readily recognize from such discussion and from the accompanying drawings and changes that various changes, modifications and variations can be made therein without departing from the spirit and scope of the present invention as described in the following claims.

What is claimed is:

1. A multiple-node vehicle communications network comprising:

a multiple-access communications bus for communicating data information thereon;

a first transceiver having a first transmitter and a first receiver interfacing with the communications bus, the first transmitter producing a first voltage output for sourcing current onto the bus when the first voltage output exceeds a voltage potential on the bus;

a second transceiver having a second transmitter and a second receiver interfacing with the communications bus, the second transmitter producing a second voltage output for sourcing current onto the communications bus when the second voltage output exceeds the voltage potential on the bus;

a first resistive element coupled between the first transmitter and the communications bus for reducing a rate of change of current on the communications bus when the first transmitter is sourcing current; and a second resistive element coupled between the second transmitter and the communications bus for reducing a rate of change of current on the communications bus when the second transmitter is sourcing current.

2. The network as defined in claim 1 wherein the first and second resistive elements provide substantially equal resistance.

3. The network as defined in claim 1 wherein said first and second voltage outputs represent variable pulse width modulated encoded signals.

4. The network as defined in claim 3 wherein said communications bus comprises a standard J1850 bus in a vehicle.

5. The network as defined in claim 1 further comprising a resistor and capacitor circuit coupled between the communications bus and a signal ground.

6. The network as defined in claim 1 wherein said first and second resistive elements provide a resistance of 20 ohms or less.

7. A multiple-node vehicle communications network comprising:

a multiple access communications bus for communicating variable pulse width modulated encoded signals;

a plurality of nodes interfacing with the communications bus, each node including a transceiver having a transmitter with an output circuit for producing a voltage output, the transmitter being operable to source current onto the bus when the voltage output exceeds a voltage potential seen on the bus; and a plurality of resistive elements, wherein one of the resistive elements is coupled between each transmitter and said communications bus for reducing a rate of change of current on the communications bus.

8. The network as defined in claim 7 wherein said resistive element has a resistance of 20 ohms or less.

9. The network as defined in claim 7 wherein said voltage output comprises a variable pulse width modulated encoded signal.

10. The network as defined in claim 9 wherein said communications bus comprises a standard J1850 bus in a vehicle.

* * * * *